(12) United States Patent
Liu

(10) Patent No.: US 9,924,742 B2
(45) Date of Patent: Mar. 27, 2018

(54) SOFT ATOMIZER CONNECTOR FIXING STRUCTURE AND ELECTRONIC CIGARETTE

(71) Applicant: KIMREE HI-TECH INC., Tortola (VG)

(72) Inventor: Qiuming Liu, Guangdong (CN)

(73) Assignee: HUIZHOU KIMREE TECHNOLOGY CO., LTD. SHENZHEN BRANCH, Shenzhen, Guangdong (CN)

( * ) Notice: Subject to any disclaimer, the term of this patent is extended or adjusted under 35 U.S.C. 154(b) by 0 days.

(21) Appl. No.: 14/370,597

(22) PCT Filed: Dec. 31, 2013

(86) PCT No.: PCT/CN2013/091039
§ 371 (c)(1),
(2) Date: Jul. 3, 2014

(87) PCT Pub. No.: WO2015/085638
PCT Pub. Date: Jun. 18, 2015

(65) Prior Publication Data
US 2016/0286859 A1    Oct. 6, 2016

(30) Foreign Application Priority Data
Dec. 9, 2013    (CN) .................... 2013 2 0804789 U

(51) Int. Cl.
*A24F 47/00*    (2006.01)
*H01M 2/20*    (2006.01)
(Continued)

(52) U.S. Cl.
CPC ............... *A24F 47/008* (2013.01); *C09J 7/02* (2013.01); *F16B 2/08* (2013.01); *A47F 8/02* (2013.01); *H01M 2/20* (2013.01)

(58) Field of Classification Search
None
See application file for complete search history.

(56) References Cited

U.S. PATENT DOCUMENTS 3,771,534 A * 11/1973 Kuehne ................... A24F 13/06
        131/187
5,530,225 A *  6/1996 Hajaligol .............. A24F 47/008
        131/194

(Continued)

FOREIGN PATENT DOCUMENTS

| CN | 202262413 U | 6/2012 |
|----|-------------|--------|
| CN | 203058296 U | 7/2013 |

(Continued)

OTHER PUBLICATIONS

International Search Report for the corresponding PCT Application No. PCT/CN2013/091039; dated Sep. 15, 2014, English translation not available.

(Continued)

*Primary Examiner* — Joseph M Pelham
(74) *Attorney, Agent, or Firm* — U.S. Fairsky LLP; Yue Xu

(57) ABSTRACT

A soft atomizer connector fixing structure includes a connector, an atomizing sleeve, a connecting ring, a protection sleeve and an adhesive tape, the connector includes a connecting front end configured to connect the atomizing sleeve and a connecting rear end configured to connect a battery assembly. The connecting front end includes a stepped connecting portion having first and second connecting portions; the second connecting portion is located between the first connecting portion and the connecting rear end, and the first connecting portion has an outer diameter smaller than an outer diameter of the second connecting portion; a limiting groove is provided at one side, connected to the second connecting portion, of the first connecting (Continued)

portion; the atomizing sleeve is sleeved on the first connecting portion; the connecting ring is sleeved on the atomizing sleeve and the second connecting portion; and the protection sleeve is sleeved on the atomizing sleeve.

20 Claims, 8 Drawing Sheets

(51) Int. Cl.
C09J 7/02 (2006.01)
F16B 2/08 (2006.01)
A47F 8/02 (2006.01)

(56) References Cited

U.S. PATENT DOCUMENTS

| | | | | |
|---|---|---|---|---|
| 5,665,262 | A * | 9/1997 | Hajaligol | A24F 47/008 131/194 |
| 5,878,752 | A * | 3/1999 | Adams | A24F 47/008 131/194 |
| 2006/0283849 | A1* | 12/2006 | Sakurai | H05B 3/141 219/444.1 |
| 2009/0095312 | A1* | 4/2009 | Herbrich | A61M 11/041 131/273 |
| 2011/0254444 | A1* | 10/2011 | Yeulash | H05H 1/2406 315/70 |
| 2013/0220315 | A1* | 8/2013 | Conley | A24F 47/008 128/202.21 |
| 2013/0319407 | A1 | 12/2013 | Liu | |
| 2013/0319438 | A1 | 12/2013 | Liu | |
| 2014/0041655 | A1* | 2/2014 | Barron | A61M 11/042 128/202.21 |
| 2014/0151363 | A1* | 6/2014 | Gros D'Aillon | G21C 17/001 219/534 |
| 2014/0261489 | A1* | 9/2014 | Cadieux | A24F 47/008 131/328 |
| 2015/0027461 | A1* | 1/2015 | Liu | A24F 47/008 131/329 |
| 2015/0027464 | A1* | 1/2015 | Liu | A24F 47/008 131/329 |
| 2015/0083144 | A1* | 3/2015 | Xiang | A24F 47/008 131/328 |
| 2015/0272221 | A1* | 10/2015 | Liu | A24F 47/008 131/273 |
| 2016/0029698 | A1* | 2/2016 | Xiang | H04B 5/0025 131/328 |
| 2016/0183593 | A1* | 6/2016 | Liu | A24F 47/008 392/386 |
| 2016/0183594 | A1* | 6/2016 | Liu | A24F 47/008 392/386 |
| 2016/0242464 | A1 | 8/2016 | Liu | |
| 2016/0286859 | A1* | 10/2016 | Liu | A24F 47/008 |
| 2016/0295924 | A1* | 10/2016 | Liu | A24F 47/008 |
| 2016/0353798 | A1* | 12/2016 | Liu | A24F 47/008 |
| 2016/0366936 | A1* | 12/2016 | Liu | A24F 47/008 |
| 2017/0162979 | A1* | 6/2017 | Liu | H01R 13/6205 |
| 2017/0172207 | A1* | 6/2017 | Liu | A24F 47/008 |

FOREIGN PATENT DOCUMENTS

WO 2013/149484 A1 10/2013
WO 2015/070494 A1 5/2015

OTHER PUBLICATIONS

European Search Report dated Aug. 14, 2017.

* cited by examiner

A: a state without being subjected to a force    B: a state being subjected to a force A: a state without being subjected to a force B: a state being subjected to a force

SOFT ATOMIZER CONNECTOR FIXING STRUCTURE AND ELECTRONIC CIGARETTE

The present application is the national phase of International Application No. PCT/CN2013/091039, titled "SOFT ATOMIZER CONNECTOR FIXING STRUCTURE AND ELECTRONIC CIGARETTE", filed on Dec. 31, 2013, which claims the benefit of priority to Chinese Patent Application No. 201320804789.7, entitled "SOFT ATOMIZER CONNECTOR FIXING STRUCTURE AND ELECTRONIC CIGARETTE", filed with the Chinese State Intellectual Property Office on Dec. 9, 2013, both of which applications are incorporated herein in their entireties by this reference.

FIELD

The present application relates to the technical field of electronic cigarettes, in particular to a soft atomizer connector fixing structure and an electronic cigarette.

BACKGROUND

An electronic cigarette is a common electronic simulation cigarette product, which mainly includes a liquid storage cotton, an atomizing device and a battery assembly. The battery assembly supplies electric energy for the atomizing device, thus the atomizing device may generate heat to vaporize liquid in the liquid storage cotton to emit smoke, thereby simulating the real cigarette.

The atomizing device is connected to the battery assembly via a connector. As shown in FIG. 1, a protection sleeve and a connecting ring are sleeved on an outer surface of a atomizing sleeve. The protection sleeve and the connecting ring are adhered together by an adhesive tape and are fixed on the atomizing sleeve, the atomizing sleeve is installed at one end of the connector and the battery assembly is installed at the other end of the connector, thus the atomizing device and the battery assembly are connected.

However, since the atomizing sleeve is made of soft materials and has a smooth surface, the protection sleeve, the connecting ring and the atomizing sleeve are prone to fall off the connector of the electronic cigarette when the adhesive tape is subjected to an external force in a direction away from the battery assembly, which may cause a poor user experience.

Thus, in view of this, a technical problem to be solved presently by those skilled in the art is to improve the structure of the electronic cigarette to connect the atomizing device with the battery assembly securely.

SUMMARY

A soft atomizer connector fixing structure and an electronic cigarette are provided in the present application, a connecting end, configured to connect an atomizing sleeve, of a connector is designed as a stepped connecting portion, and a connecting ring is sleeved on the atomizing sleeve and the connector, thus the atomizing sleeve, the connecting ring and a protection sleeve may be effectively fixed at the connector.

A soft atomizer connector fixing structure according to an embodiment of the present application includes a connector, an atomizing sleeve, a connecting ring, a protection sleeve and an adhesive tape;

the connector includes a connecting front end configured to connect the atomizing sleeve and a connecting rear end configured to connect a battery assembly, and the connecting front end includes a stepped connecting portion having a first connecting portion and a second connecting portion;

the second connecting portion is located between the first connecting portion and the connecting rear end, and the first connecting portion has an outer diameter smaller than an outer diameter of the second connecting portion;

a limiting groove is provided at one side, connected to the second connecting portion, of the first connecting portion;

the atomizing sleeve is sleeved on the first connecting portion;

the connecting ring is sleeved on the atomizing sleeve and the second connecting portion;

the protection sleeve is sleeved on the atomizing sleeve, and one end of the atomizing sleeve is connected to the connecting ring; and the adhesive tape (5) is adhered on the protection sleeve (4) and the connecting ring (3).

Optionally, in a case that the first connecting portion is connected to the atomizing sleeve, the outer diameter of the first connecting portion is not smaller than an inner diameter of the connecting ring.

Optionally, a cross section of the limiting groove is rectangular or inverted trapezoidal.

Optionally, an anti-slip pattern is provided on an outer side of the second connecting portion.

Optionally, the anti-slip pattern includes a diamond embossed pattern uniformly distributed on the outer side of the second connecting portion.

Optionally, dentate threads are provided on an outer side of the second connecting portion.

Optionally, a groove is provided at an end, connected to the first connecting portion, of the second connecting portion.

Optionally, a cross section of the groove is of a right triangular shape with an arc side.

An electronic cigarette according to an embodiment of the present application includes an atomizing device, a connecting component and a battery assembly, and the atomizing device is connected to the battery assembly via the connecting component.

The connecting component is the soft atomizer connector fixing structure.

In the soft atomizer connector fixing structure and the electronic cigarette of the present application, the connecting end, configured to connect the atomizing sleeve, of the connector is designed as a stepped connecting portion, the atomizing sleeve is sleeved on a smaller part of the stepped connecting portion, and the connecting ring is sleeved on the atomizing sleeve and a larger part of the stepped connecting portion. Thus, the atomizing sleeve, the connecting ring and the protection sleeve may be effectively fixed at the connector. Furthermore, the friction force between the connecting ring and the connector may be further increased by arranging the anti-slip pattern on the larger part of the stepped connecting portion, thereby further improving the user experience.

BRIEF DESCRIPTION OF THE DRAWINGS

For more clearly illustrating embodiments of the present application or the technical solution in the conventional technology, drawings referred to describe the embodiments or the conventional technology is briefly described hereinafter. Apparently, the drawings in the following description are only a few of embodiments of the present application, and for those skilled in the art other drawings may be obtained based on these drawings without any creative efforts.

DETAILED DESCRIPTION OF THE EMBODIMENTS

A soft atomizer connector fixing structure and an electronic cigarette are provided in the present application, a connecting end, configured to connect an atomizing sleeve, of a connector is designed as a stepped connecting portion, and a connecting ring is sleeved on the atomizing sleeve and the connector, thus the atomizing sleeve, the connecting ring and a protection sleeve may be effectively fixed at the connector.

Figure 1:
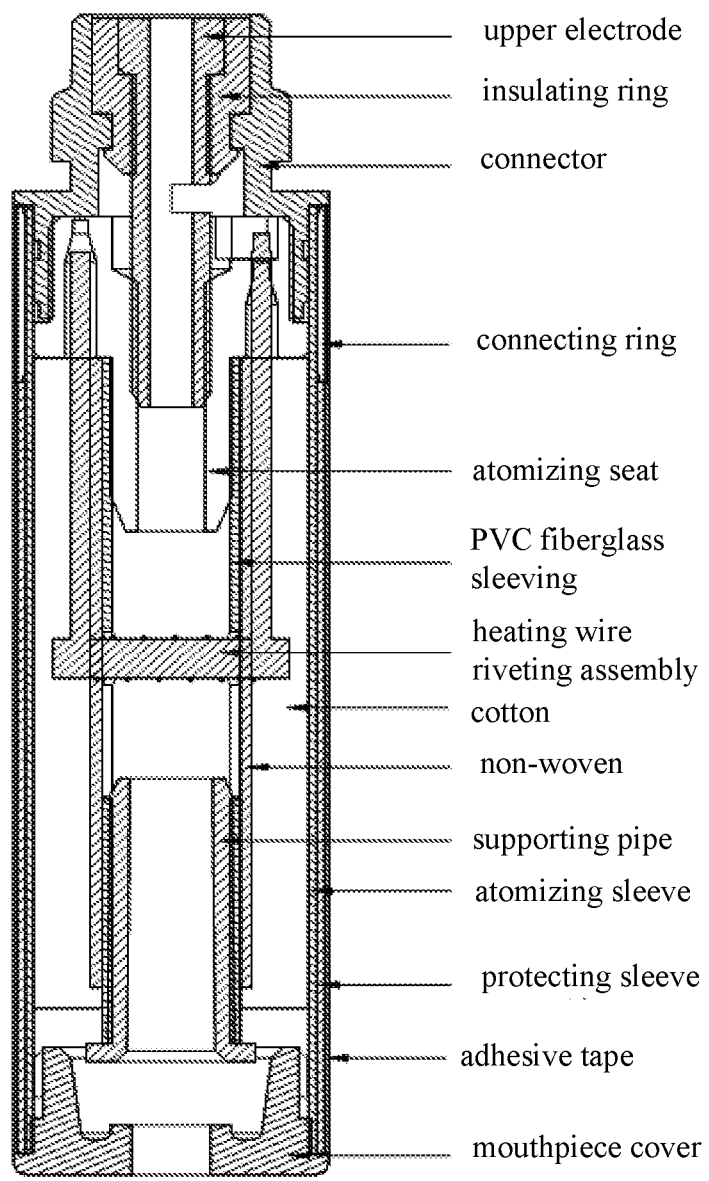
FIG. 1 is a sectional view of an electronic cigarette in the conventional technology.
Figure 2:
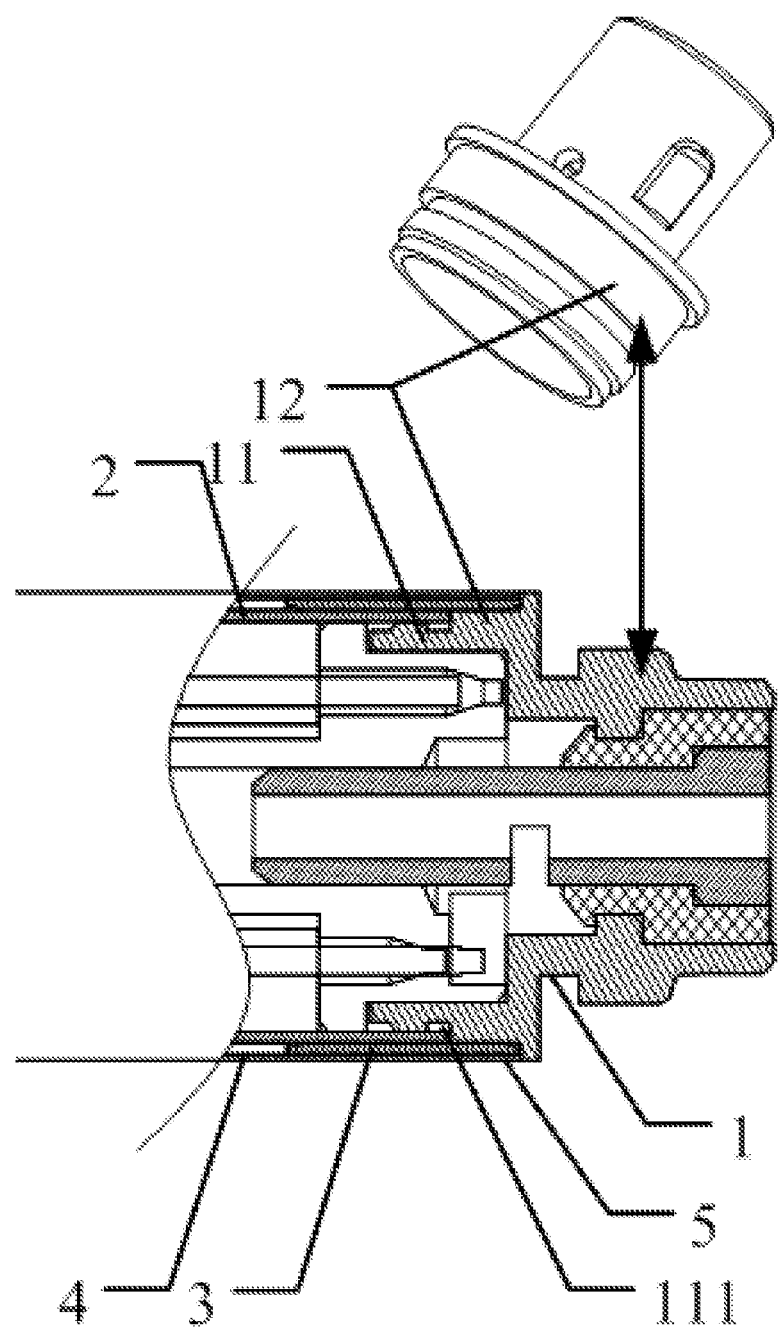
FIG. 2 is a schematic view showing the structure of a soft atomizer connector fixing structure according to a first embodiment of the present application.
Figure 3:
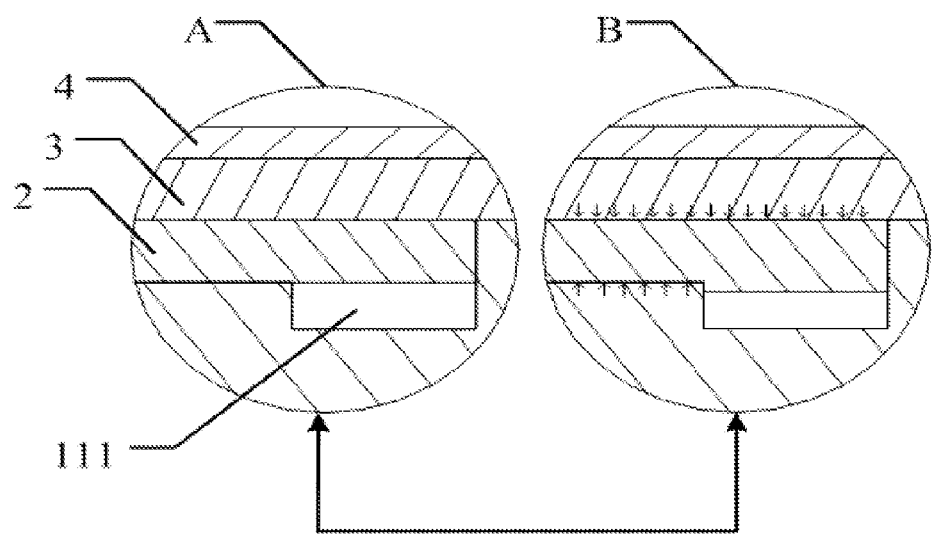
FIG. 3 is a stress analysis diagram of the soft atomizer connector fixing structure according to the first embodiment of the present application.

The technical solutions in the embodiments of the present application are described clearly and completely hereinafter in conjunction with the drawings in the embodiments of the present application. Apparently, the described embodiments are only a few of but not all embodiments of the present application. Based on the embodiments in the present application, all of other embodiments, made by the person skilled in the art without any creative efforts, fall into the scope of the present application. Referring to FIGS. 2 and 3, according to a first embodiment of the present application, the soft atomizer connector fixing structure includes a connector 1, an atomizing sleeve 2, a connecting ring 3, a protection sleeve 4 and an adhesive tape 5.

The connector 1 includes a connecting front end configured to connect the atomizing sleeve 2 and a connecting rear end configured to connect a battery assembly. The connecting front end includes a stepped connecting portion having a first connecting portion 11 and a second connecting portion 12.

The second connecting portion 12 is located between the first connecting portion 11 and the connecting rear end, and the first connecting portion 11 has an outer diameter smaller than an outer diameter of the second connecting portion 12.

A limiting groove 111 is provided at one side, connected to the second connecting portion 12, of the first connecting portion 11.

The atomizing sleeve 2 is sleeved on the first connecting portion 11.

The connecting ring 3 is sleeved on the atomizing sleeve 2 and the second connecting portion 12.

The protection sleeve 4 is sleeved on the atomizing sleeve 2, and one end of the atomizing sleeve 2 is connected to the connecting ring 3.

The adhesive tape 5 is adhered on the protection sleeve 4 and the connecting ring 3.

Optionally, after the first connecting portion 11 is connected to the atomizing sleeve 2, the outer diameter of the first connecting portion 11 is not smaller than an inner diameter of the connecting ring 3.

Optionally, a cross section of the limiting groove 111 is rectangular or inverted trapezoidal.

The soft atomizer connector fixing structure according to the present application includes the connector 1, the atomizing sleeve 2, the connecting ring 3, the protection sleeve 4 and the adhesive tape 5. The atomizing sleeve 2 is sleeved on an outer surface of the first connecting portion 11 of the connector 1, and then the connecting ring 3 is sleeved on outer surfaces of the atomizing sleeve 2 and the second connecting portion 12 of the connector 1, thus the atomizing sleeve 2 is fixed on the connector 1. Since both the connector 1 and the connecting ring 3 are metallic components, the connector 1 and the connecting ring 3 may be closely fixed. Reference is made to FIG. 3, the adhesive tape 5 is wrapped on the protection sleeve and the connecting ring 3, and since the atomizing sleeve 2 is made of a soft material, the atomizing sleeve 2 inside the adhesive tape 5 is squeezed to be deformed when the adhesive tape 5 is pulled by an external force in a direction towards the first connecting portion 11. Specifically, the squeezed portion of the atomizing sleeve 2 shrinks and the end portion thereof expands. The limiting groove 111 of the connector 1 may accommodate the expanded end portion of the atomizing sleeve 2, and the atomizing sleeve 2 is not apt to fall off due to the limiting effect of the limiting groove 111 on the expanded end portion of the atomizing sleeve 2.

Optionally, an anti-slip pattern 121 is provided on an outer side of the second connecting portion 12.

Optionally, the anti-slip pattern 121 includes a diamond embossed pattern uniformly distributed on the outer side of the second connecting portion 12.

Figure 4:
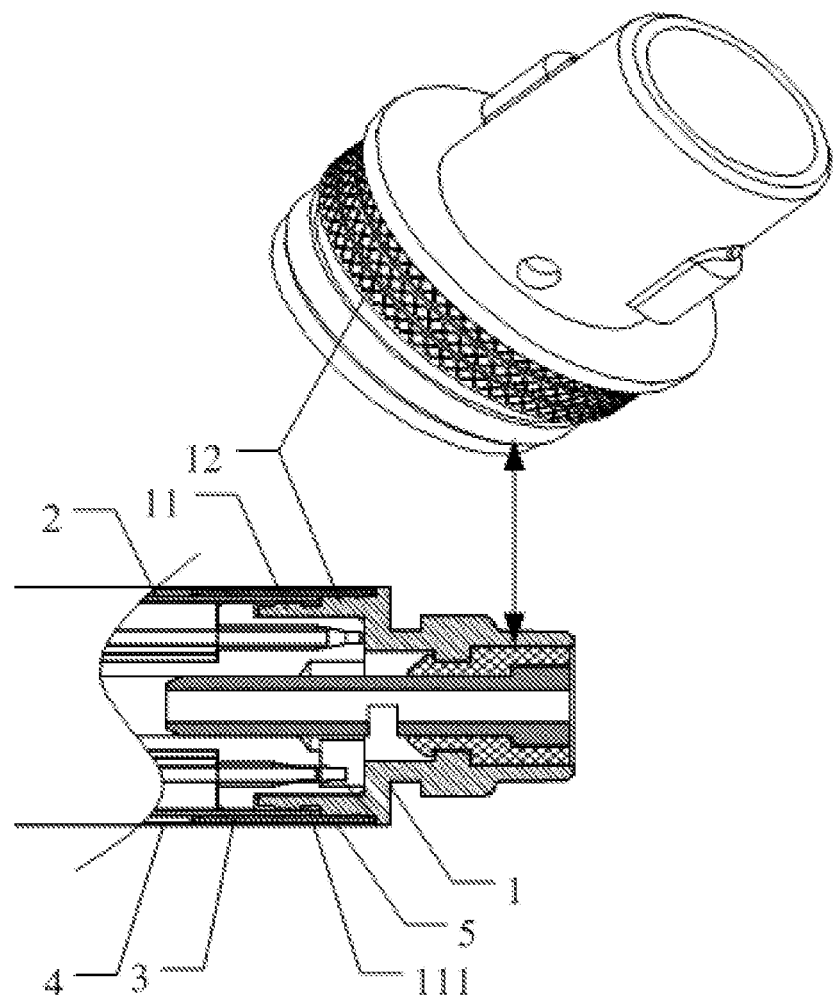
FIG. 4 is a schematic view showing the structure of a soft atomizer connector fixing structure according to a second embodiment of the present application.

Reference is made to FIG. 4, which shows a second embodiment of the soft atomizer connector fixing structure according to the present application. Unlike the first embodiment, in this embodiment, an anti-slip pattern 121 is provided on an outer side of the second connecting portion 12, which may increase the frictional force between the connecting ring 3 and the connector 1, thus the connecting ring 3 and the connector 1 may be better fixed. It should be noted that, the anti-slip pattern 121 is not limited to the above-described diamond embossed pattern, and may also be uniformly distributed semicircular salient points, wave-shaped embossed pattern or other embossed pattern with special meanings, which are not limited herein.

Optionally, dentate threads 122 are provided on the outer side of the second connecting portion 12.

Figure 5:
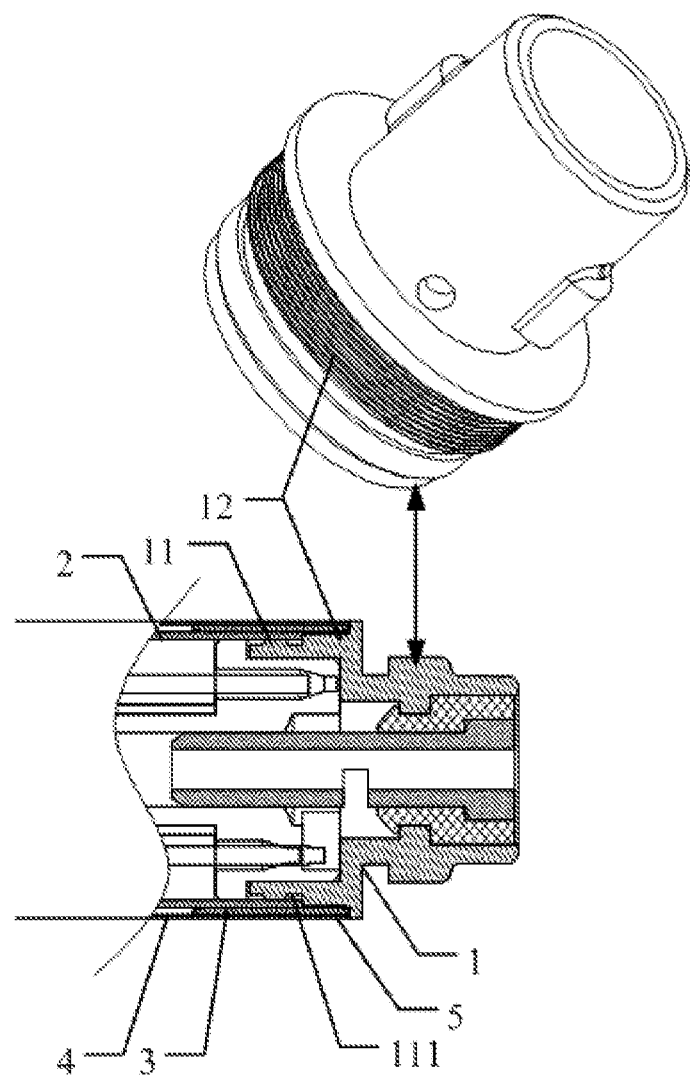
FIG. 5 is a schematic view showing the structure of a soft atomizer connector fixing structure according to a third embodiment of the present application.

Reference is made to FIG. 5, which shows a third embodiment of the soft atomizer connector fixing structure according to the present application. Unlike the first embodiment, in this embodiment, dentate threads 122 are provided on an outer side of the second connecting portion 12, which may increase the frictional force between the connecting ring 3 and the connector 1, thus the connecting ring 3 and the connector 1 may be better fixed. It should be noted that, the connecting ring 3 may be provided with dentate threads configured to cooperate with the dentate threads 122, and during the assembling, the connector 1 may be connected to the connecting ring 3 by screwing, and in this case, a tightness between the connector 1 and the connecting ring 3 is further enhanced.

Optionally, a groove 123 is provided at an end, connected to the first connecting portion 11, of the second connecting portion 12.

Optionally, a cross section of the groove 123 is of a right triangular shape with an arc side.

Figure 6:
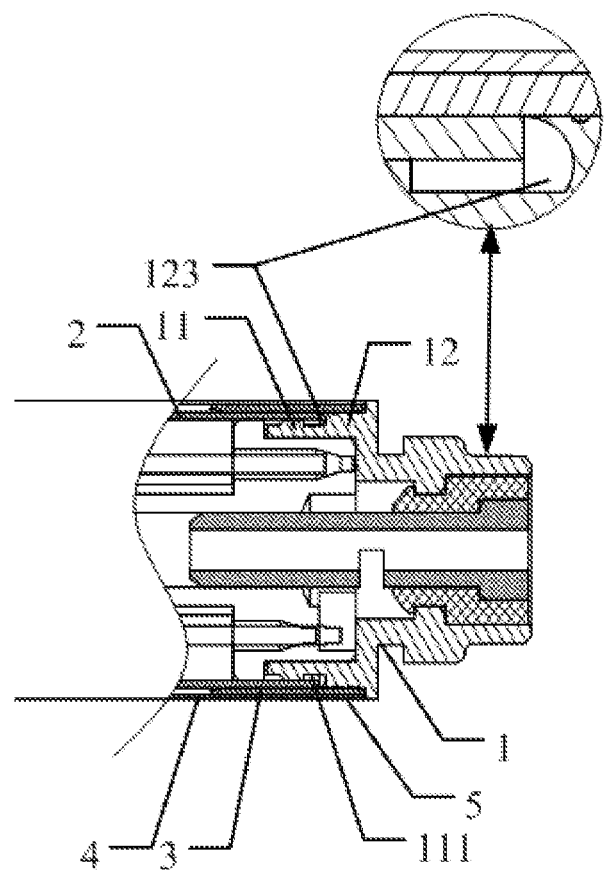
FIG. 6 is a schematic view showing the structure of a soft atomizer connector fixing structure according to a fourth embodiment of the present application.
Figure 7:
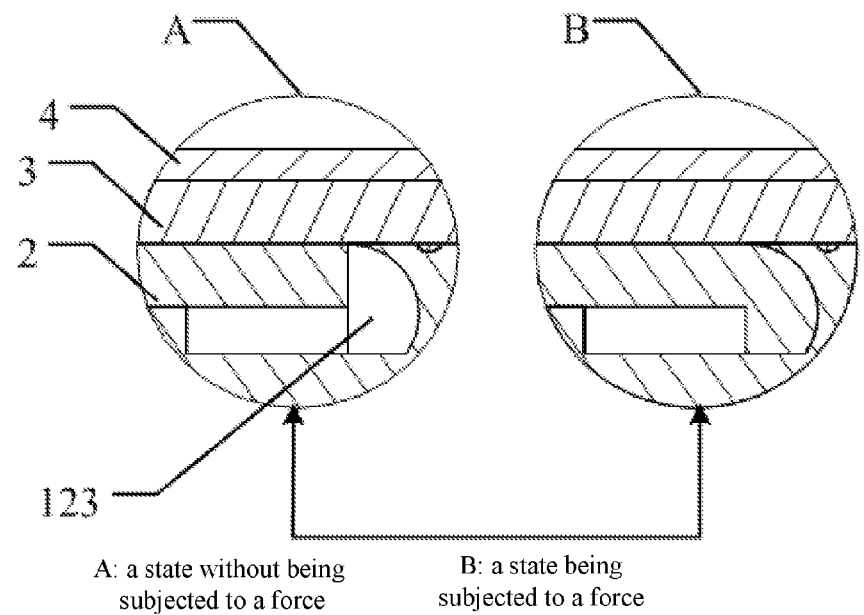
FIG. 7 is a stress analysis diagram of the soft atomizer connector fixing structure according to the fourth embodiment of the present application.

Reference is made to FIG. 6, which shows a third embodiment of the soft atomizer connector fixing structure according to the present application. Unlike the first embodiment, in this embodiment, a groove 123 is provided at an end, connected to the first connecting portion 11, of the second connecting portion 12. Referring FIG. 7, since the atomizing sleeve 2 is made of a soft material, the atomizing sleeve 2 inside the adhesive tape 5 is squeezed to be deformed when the adhesive tape 5 is pulled by an external force in a direction towards the first connecting portion 11. Specifically, the squeezed portion of the atomizing sleeve 2 shrinks and the end portion thereof expands and fills the groove 123. The atomizing sleeve 2 is not apt to fall off due to the limiting effect of the groove 123 on the expanded end portion of the atomizing sleeve 2.

It should be further noted that, the groove 123 may be provided in the first, second and third embodiments of the soft atomizer connector fixing structure of the present application, which is not limited herein.

The soft atomizer connector fixing structure of the present application is described hereinabove, the connecting end, configured to connect the atomizing sleeve 2, of the connector 1 is designed as a stepped connecting portion, the atomizing sleeve 2 is sleeved on a smaller part of the stepped connecting portion, and the connecting ring 2 is sleeved on the atomizing sleeve 2 and a larger part of the stepped connecting portion. In this case, according to the soft atomizer connector fixing structure of the present application, the atomizing sleeve 2, the connecting ring 3 and the protection sleeve 4 may be effectively fixed at the connector 1. Furthermore, the friction force between the connecting ring 3 and the connector 1 may be further increased by arranging the anti-slip pattern 121, dentate threads 122 and the groove 123 on the larger part of the stepped connecting portion, thereby further improving the user experience.

Figure 8:
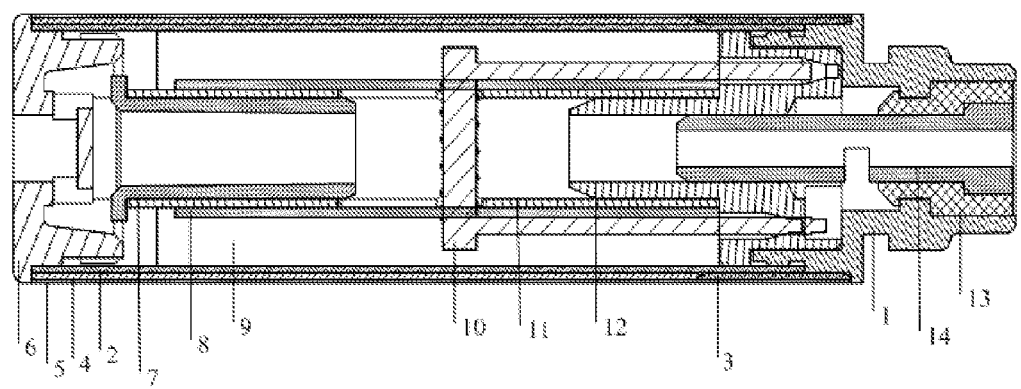
FIG. 8 is a schematic view showing the structure of an electronic cigarette (without a battery assembly) according to an embodiment of the present application.
Figure 9:
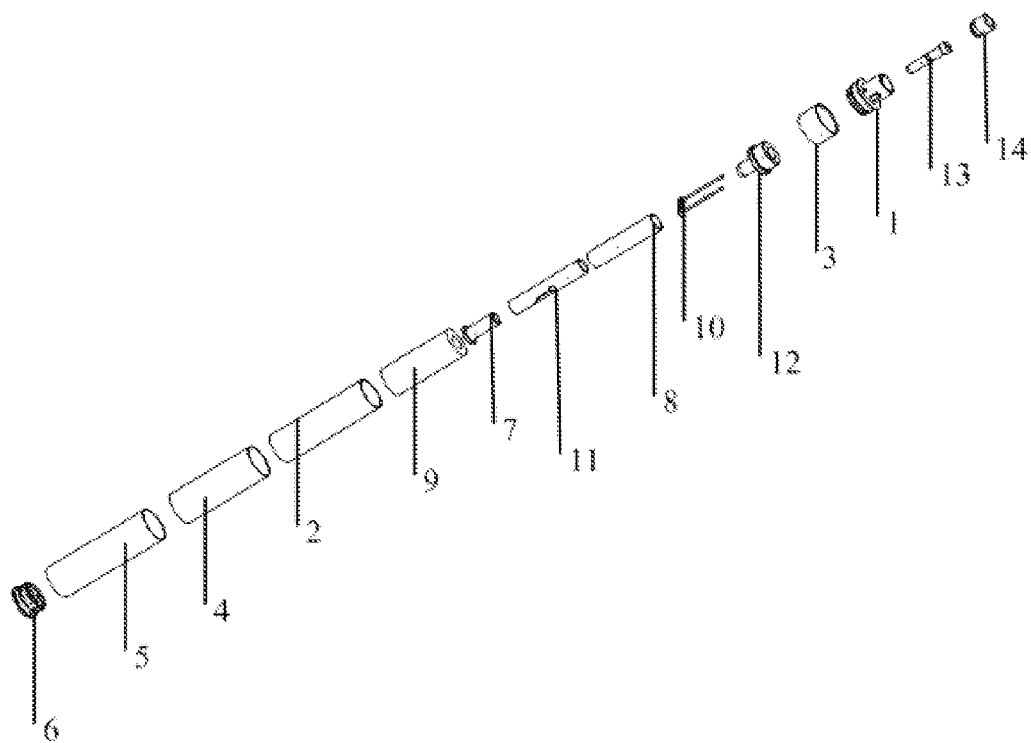
FIG. 9 is an exploded view showing the structure of an electronic cigarette (without a battery assembly) according to the present application.

An embodiment of an electronic cigarette according to the present application is described hereinafter. Reference is made to FIGS. 8 and 9, the electronic cigarette according to the present application includes an atomizing device, a connecting component and a battery assembly, and the atomizing device is connected to the battery assembly via the connecting component.

The connecting component is the soft atomizer connector fixing structure described hereinabove.

According to the electronic cigarette provided in the present application, the atomizing device and the battery assembly may be firmly connected via the soft atomizer connector fixing structure.

Reference is made to FIG. 8, the electronic cigarette includes a mouthpiece cover 6, an adhesive tape 5, a protection sleeve 4, an atomizing sleeve 2, a supporting pipe 7, a non-woven 8, a cotton 9, a heating wire riveting assembly 10, a PVC fiberglass sleeving 11, an atomizing seat 12, a connecting ring 3, a connector 1, an insulating ring 13, an upper electrode 14, and a battery assembly (not shown).

According to the electronic cigarette provided in the present application, the connecting end, configured to connect the atomizing sleeve 2, of the connector 1 is designed as a stepped connecting portion, the atomizing sleeve 2 is sleeved on a smaller part of the stepped connecting portion, and the connecting ring 2 is sleeved on the atomizing sleeve 2 and a larger part of the stepped connecting portion. The atomizing device and the battery assembly may be firmly fixed by the soft atomizer connector fixing structure of the present application. Furthermore, the friction force between the connecting ring 3 and the connector 1 may be further increased by arranging the anti-slip pattern 121, dentate threads 122 and the groove 123 on the larger part of the stepped connecting portion, thereby further improving the user experience.

A soft atomizer connector fixing structure and an electronic cigarette provided in the present application are described in detail hereinbefore. The principle and the embodiments of the present application are illustrated herein by specific examples. The above description of examples is only intended to help the understanding of the method and the spirit of the present application. It should be noted that, for the person skilled in the art, many modifications and improvements may be made to the present application without departing from the principle of the present application, and these modifications and improvements are also deemed to fall into the scope of the present application defined by the claims.

The invention claimed is:

1. A soft atomizer connector fixing structure, comprising a connector, an atomizing sleeve, a connecting ring, a protection sleeve and an adhesive tape, wherein, the connector comprises a connecting front end configured to connect the atomizing sleeve and a connecting rear end configured to connect a battery assembly, and the connecting front end comprises a stepped connecting portion having a first connecting portion and a second connecting portion;

the second connecting portion is located between the first connecting portion and the connecting rear end, and the first connecting portion has an outer diameter smaller than an outer diameter of the second connecting portion;

a limiting groove is provided between the second connecting portion and the first connecting portion;

the atomizing sleeve is sleeve-coupled to the first connecting portion;

the connecting ring is sleeve-coupled to the atomizing sleeve and the second connecting portion;

the protection sleeve is sleeve-coupled to the atomizing sleeve; and the adhesive tape is adhered on the protection sleeve.

2. The soft atomizer connector fixing structure according to claim 1, in a case that the first connecting portion is connected to the atomizing sleeve, the outer diameter of the first connecting portion is not smaller than an inner diameter of the connecting ring.

3. The soft atomizer connector fixing structure according to claim 1, wherein, a cross section of the limiting groove is rectangular or inverted trapezoidal.

4. The soft atomizer connector fixing structure according to claim 1, wherein, an anti-slip pattern is provided on an outer side of the second connecting portion.

5. The soft atomizer connector fixing structure according to claim 4, wherein,
the anti-slip pattern comprises a diamond embossed pattern uniformly distributed on the outer side of the second connecting portion.

6. The soft atomizer connector fixing structure according to claim 1, wherein,
dentate threads are provided on an outer side of the second connecting portion.

7. The soft atomizer connector fixing structure according to claim 1, wherein,
a groove is provided at an end, connected to the first connecting portion, of the second connecting portion.

8. The soft atomizer connector fixing structure according to claim 7, wherein,
a cross section of the groove is of a right triangular shape with the hypotenuse being replaced by an arc.

9. The soft atomizer connector fixing structure according to claim 2, wherein,
a groove is provided at an end, connected to the first connecting portion, of the second connecting portion.

10. The soft atomizer connector fixing structure according to claim 4, wherein,
a groove is provided at an end, connected to the first connecting portion, of the second connecting portion.

11. The soft atomizer connector fixing structure according to claim 5, wherein,
a groove is provided at an end, connected to the first connecting portion, of the second connecting portion.

12. The soft atomizer connector fixing structure according to claim 6, wherein,
a groove is provided at an end, connected to the first connecting portion, of the second connecting portion.

13. An electronic cigarette, comprising an atomizing device, a connecting component and a battery assembly, the atomizing device being connected to the battery assembly via the connecting component, wherein,
the connecting component is a soft atomizer connector fixing structure, and the soft atomizer connector fixing structure, comprises a connector, an atomizing sleeve, a connecting ring, a protection sleeve and an adhesive tape, wherein,
the connector comprises a connecting front end configured to connect the atomizing sleeve and a connecting rear end configured to connect the battery assembly, and the connecting front end comprises a stepped connecting portion having a first connecting portion and a second connecting portion;
the second connecting portion is located between the first connecting portion and the connecting rear end, and the first connecting portion has an outer diameter smaller than an outer diameter of the second connecting portion;
a limiting groove is provided between the second connecting portion and the first connecting portion;
the atomizing sleeve is sleeve-coupled to the first connecting portion;
the connecting ring is sleeve-coupled to the atomizing sleeve and the second connecting portion;
the protection sleeve is sleeve-coupled to the atomizing sleeve; and
the adhesive tape is adhered on the protection sleeve.

14. The electronic cigarette according to claim 13, wherein in a case that the first connecting portion is connected to the atomizing sleeve, the outer diameter of the first connecting portion is not smaller than an inner diameter of the connecting ring.

15. The electronic cigarette according to claim 13, wherein a cross section of the limiting groove is rectangular or inverted trapezoidal.

16. The electronic cigarette according to claim 13, wherein an anti-slip pattern is provided on an outer side of the second connecting portion.

17. The electronic cigarette according to claim 16, wherein the anti-slip pattern comprises a diamond embossed pattern uniformly distributed on the outer side of the second connecting portion.

18. The electronic cigarette according to claim 13, wherein dentate threads are provided on an outer side of the second connecting portion.

19. The electronic cigarette according to claim 13, wherein a groove is provided at an end, connected to the first connecting portion, of the second connecting portion.

20. The electronic cigarette according to claim 19, wherein a cross section of the groove is of a right triangular shape with the hypotenuse being replaced by an arc.

* * * * *